United States Patent [19]

Kremzow

[11] 4,112,030
[45] Sep. 5, 1978

[54] METHOD AND SYSTEM FOR THE PRODUCTION OF SHEET OR PLATTER SHAPED INFORMATION CARRIERS

[75] Inventor: Martin Kremzow, Hanover, Fed. Rep. of Germany

[73] Assignee: Siemens Aktiengesellschaft, Berlin and Munich, Fed. Rep. of Germany

[21] Appl. No.: 682,451

[22] Filed: May 3, 1976

[30] Foreign Application Priority Data

May 2, 1975 [DE] Fed. Rep. of Germany ....... 2519476

[51] Int. Cl.² .............................................. B29D 17/00
[52] U.S. Cl. ...................................... 264/25; 264/106; 264/251
[58] Field of Search ................... 264/22, 25, 106, 107, 264/251, 255

[56] References Cited

U.S. PATENT DOCUMENTS

| 2,283,286 | 5/1942 | Porth | 264/251 |
| 2,303,395 | 12/1942 | Schultz | 264/251 X |
| 3,421,501 | 1/1969 | Beightol | 264/22 |

Primary Examiner—Thomas P. Pavelko
Attorney, Agent, or Firm—Hill, Gross, Simpson, Van Santen, Steadman, Chiara & Simpson

[57] ABSTRACT

A method is provided for the production of sheet or platter shaped information carriers or records having surface structures thereon which correspond to recorded information, in particular video-signal memories of high storage capacity. An original or master information carrier or record has originally recorded information formed as a surface structure. This original is used to produce duplicate sheet or platter shaped records by applying a lacquer layer to the surface structure of the master record, hardening the layer, and permitting the hardened layer to adhere to an unmarked surface on the duplicate record to be produced.

13 Claims, 1 Drawing Figure

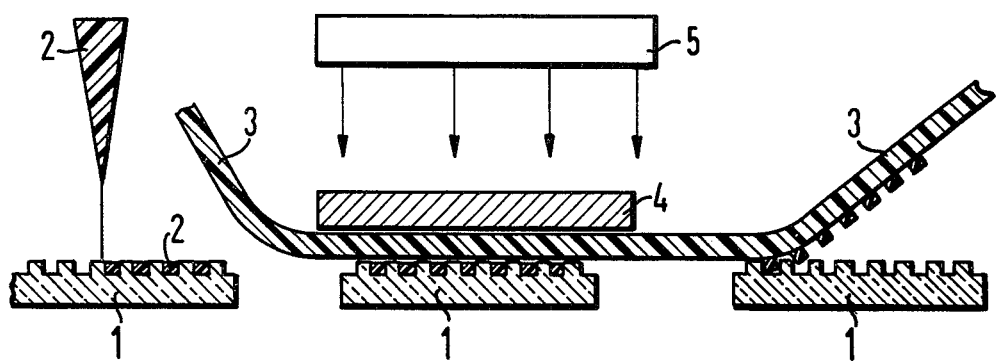

METHOD AND SYSTEM FOR THE PRODUCTION OF SHEET OR PLATTER SHAPED INFORMATION CARRIERS

BACKGROUND OF THE INVENTION

1. Field of the Invention

This invention relates to a method for the production of sheet or platter shaped information carriers and more particularly to information carriers having a high storage capacity.

2. Description of the Prior Art

In the field of phonograph records, it is known to duplicate records by molding or stamping matrices in a galvano-plastic manner from an original and to reproduce plastic record copies. The molded or stamped matrices may be formed, for example, on a lacquer sheet. If an analogous method is applied to high storage density information carriers or records having a surface structure corresponding to the information such as video records or similar items, problems occur since minor tolerance deviations may cause critical signal distortions during the galvano-plastic matrix production since the high storage density requires the formation of microstructures. In addition, the financial expense and technical expertise required for galvano-matrix production is relatively high. Therefore, this type of duplication is only recommended for high production volumes

SUMMARY OF THE INVENTION

The present invention proposes to solve the abovementioned drawbacks in as simple a manner as possible. In accordance with this invention, the original recording medium is provided with a liquid layer which overlies the surface structure to provide an even surface. The liquid is then hardened under the effect of an energy radiation. The layer side of the original carrier or record and a platter or sheet shaped information carrying material are then pressed against one another. The liquid layer on the original hardens and the information carrying material, together with the hardened layer material is lifted off from the original carrier. The advantage of this method results from the elimination of the galvanizing process. Cost is reduced together with production time between the creation of an original record and the first duplication.

BRIEF DESCRIPTION OF THE DRAWING

The drawing is a sectional view of the lacquer layering, separating, and pressing and hardening stations for the production of duplicate information carriers or records of this invention.

DESCRIPTION OF THE PREFERRED EMBODIMENTS

In the drawing, a schematic design of the device for the production of duplicate information carriers or records has been shown wherein the signal information is stored in the form of surface structures. Particularly, disc-shaped information carriers or records may be produced which have a high storage density, such as video signal memories or similar items, wherein the original information is stored on an original record by use of a spiral shaped track and successive rows of microscopically small longitudinal recesses of equal width and depth, at different spacings. Such an original record 1 is shown in sectional view in the drawing wherein the surface structure has been enlarged for illustration. The structure of the original record which, for example, may be constructed of glass, is produced by prior art techniques wherein glass plate is coated with a thin photo-resist layer which is exposed with a signal-modulated energy beam, such as a laser beam. To produce the surface structure, the exposed and developed photo-resist layer may either be directly used as a pattern or it can be subsequently subjected to an etching process as is common in the production of integrated circuits.

The original or master record or carrier 1 does not serve as a pattern for a galvano-plastic molding process for the production of a molded or stamped matrix as previously, but rather is directly used for duplicating informtion carriers or records. In a first method step, the surface structure of the glass plate forms a cast for a hardenable lacquer 2 such as plastic lacquer, a photo-resist lacquer, or a similar item. An unmarked platter or sheet shaped carrier material 3 is then placed onto this lacquer layer in a rolling process in order to avoid air inclusions. Also, a pressure plate 4 is provided which presses the carrier material 3 against the master 1 in such a way tht superfluous lacquer is pressed away or squeezed out. Subsequently, the lacquer layer is hardened through energy radiation transmitted from a source 5. A light or electron beam is preferably used together with a photo-lacquer. To produce hardening, an ultraviolet radiation is useful for the light beam which, in addition, may contain portions of infrared light which will cause an acceleration of the reaction speed. During the hardening process, the lacquer will connect itself to the plastic carrier material 3 so that the hardened lacquer structure may be lifted away from the master 1 on the carrier material 3.

For this process ultraviolet hardening lacquers are preferably used which consist of monomer or partly polymerized plastics, e.g. acrylic plastics. After curing a good adhesion of these lacquers to the plastic carrier 3 is ensured as well as an easy separation from the master surface. For the master record 1 the following glass plates may be used:

glass vaporized with silicon oxide,
glass with hardened negative or positive photoresist lacquers,
glass with exposed and developed positive or negative photoresist lacquers which are additionally coated with a thin metal layer, e.g. of nickel or chromium.

In the example shown, the carrier material 3 is supplied as a sheet from which the individual information carriers or records may be punched. However, a preshaped plastic sheet or platter may also be used as carrier material 3. A transport system (not shown) is preferably provided for the master record 1, to move it either step-by-step or continuously, from the lacquer-laying station to the separation station via the pressing and hardening station, and back again. An oxcillating sled is preferably provided for such a transport system since it will process the master 1 directly to the layering station as soon as the finished information carrier or record has been removed. It will then automatically return the master to the starting point for a new duplication or reproduction process.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A method for the production of sheet or platter shaped information carriers directly from an original carrier without use of an intermediate carrier, said information carriers having a surface structure corresponding to recorded information including video-signal memories of high storage density and the surface structure of which has the information stored in digital form as relief-like surface structure having two signal planes, comprising the steps of: providing an originally recorded rigid carrier having an original of said surface structure; providing the rigid original carrier with a layer of liquid which can be hardened under the effect of an energy radiation and which will level the surface structure; pressing together the layer side of the original carrier against an unprofiled surface of a flexible carrier material; subsequently hardening the layer liquid; and lifting the flexible carrier material off from the original carrier, together with the layer material adhering thereto forming said surface structure to create said information carriers.

2. A method in accordance with claim 1, characterized in that a plastic lacquer is used as said layer material.

3. A method in accordance with claim 1, characterized in that a photolacquer is used as said layer material and an electron beam is used for the energy radiation.

4. A method in accordance with claim 1 characterized in that a photolacquer is used as said layer material and light is used for the energy radiation.

5. A method in accordance with claim 4, characterized in that ultraviolet light is used for the energy radiation.

6. A method in accordance with claim 5, characterized in that the ultraviolet light contains a portion of infrared light.

7. A method in accordance with claim 1 characterized in that the carrier material is provided as a sheet from which individual information carriers having the adhering layer material may be punched.

8. A method according to claim 1 including the further steps of transporting the originally recorded carrier from a layering station to a separation station via a pressing and hardening station and transporting said originally recorded carrier back to said layering station.

9. A method in accordance with claim 8, in which said originally recorded carrier is transported back and forth by a sled.

10. A method in accordance with claim 8 in which the steps of transporting are performed step-by-step.

11. A method for the production of duplicate high density information carrying records from a master information carrying record without use of an intermediate carrying record, comprising the steps of:
   a. providing a master information carrying record having a surface structure for high density video information formed of information stored in digital form as a relief-like surface structure having two signal planes;
   b. applying a layer of hardenable liquid over an information carrying surface structure of the master record to cover said structure;
   c. pressing an exposed surface of said layer against an unmarked surface portion of the duplicate record to be produced;
   d. hardening said layer by exposure to an energy radiation, said hardening causing the layer to adhere to said unmarked surface portion; and
   e. lifting the duplicate record off from the master record.

12. The method of claim 11 including the further step of sequentially transporting the original record from a layering station to a pressing and hardening station, then to a separation station, and then back to said layering station.

13. The method of claim 11 in which the surface structure on the master record corresponds to video-signal information.

* * * * *

UNITED STATES PATENT AND TRADEMARK OFFICE
CERTIFICATE OF CORRECTION

PATENT NO. : 4,112,030
DATED : September 5, 1978
INVENTOR(S) : Martin Kremzow

It is certified that error appears in the above-identified patent and that said Letters Patent are hereby corrected as shown below:

The assignee indicated on the face of the patent is to be Polygram GmbH and the reference to Siemens AG is deleted.

Signed and Sealed this

Twenty-first Day of August 1979

[SEAL]

Attest:

Attesting Officer

LUTRELLE F. PARKER
Acting Commissioner of Patents and Trademarks